June 10, 1947.  H. J. KEMP  2,422,019

SEED TREATING AND HANDLING DEVICE

Filed April 21, 1944

Inventor:
Harold Jesse Kemp
By Alex E. MacRae
Attorney.

Patented June 10, 1947

2,422,019

UNITED STATES PATENT OFFICE 2,422,019

SEED TREATING AND HANDLING DEVICE

Harold Jesse Kemp, Swift Current, Saskatchewan, Canada

Application April 21, 1944, Serial No. 532,189
In Canada May 18, 1943

1 Claim. (Cl. 259—7)

This invention relates to seed treating and handling devices.

In the treatment of seeds with fine chemical dusts for disinfecting and/or fertilizing purposes it is important that the mixing of the dust with the seeds be thorough, intimate and uniform. Violent agitation may injure the seeds and is objectionable because of the difference in specific gravity of the dust and seeds. The dusts are sometimes poisonous. The desired mixing is therefore difficult to accomplish. A further difficulty is encountered in the subsequent bagging or handling of the dust-treated seeds in that such bagging or handling gives rise to large quantities of dust-laden air, which may be injurious to attendants. It is thus highly desirable that the bagging operation be carried out in such a way that control of such dust-laden air is provided.

It is an object of the present invention to provide a mixing device for seed and dust adapted to subject the same to intimate and gentle commingling. A further object is to utilize such mixing device for elevating the mixed seed and dust whereby a bagging or other handling device may be conveniently associated therewith. Another object is to provide an associated mixing and bagging device wherein the mixed seed and dust is maintained in a closed casing at all times whereby escape of dust-laden air is substantially avoided. Another object is to provide a combined mixing and bagging device which is simple in structure, has relatively few moving parts, and which occupies a minimum amount of space.

Other objects and advantages of the invention will become apparent as the description of the invention proceeds, with particular reference to the accompanying drawing, in which—

Figure 1:
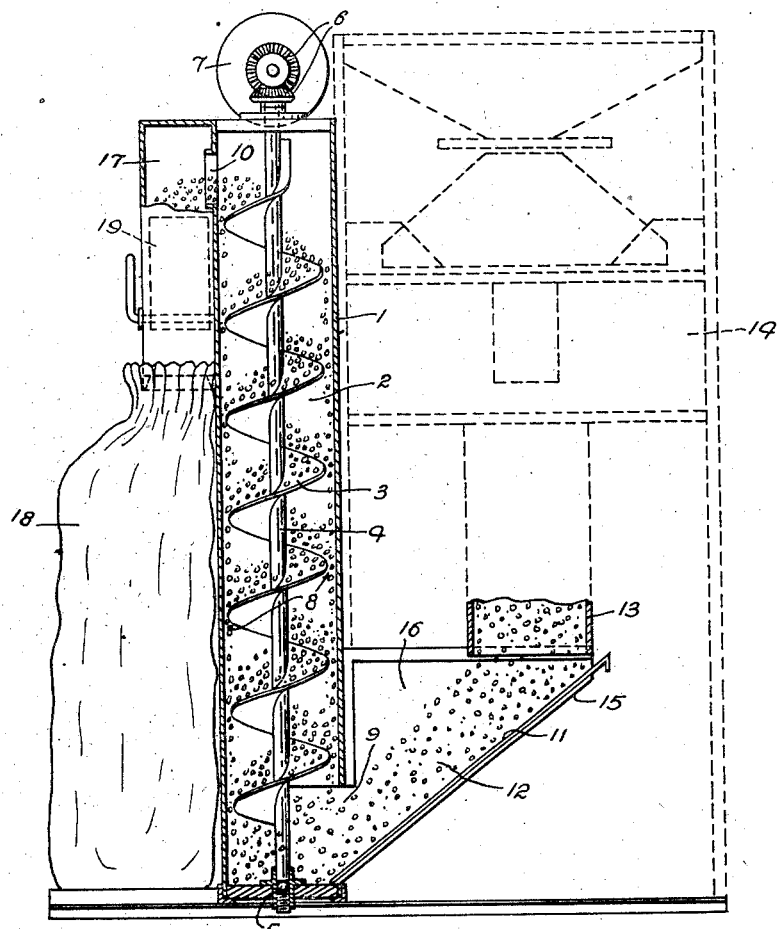
Figure 1 is a vertical sectional elevation of the device.
Figure 2:
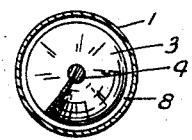
Figure 2 is a cross section of the elevating and mixing chamber.

In the drawing, 1 is an upright tube forming a vertically disposed cylindrical elevating and mixing chamber 2. A substantially helical blade constituting a screw conveyor 3 is mounted on a vertical shaft 4 axially disposed within the chamber and extends from bottom to top of the chamber. The lower end of the shaft is mounted for rotation on a ball bearing 5. Means for driving the shaft and conveyor are associated with the upper end of the shaft and comprise the bevel gears 6 and driving pulley 7. It will be observed that the overall diameter of the conveyor 3 is somewhat less than the inside diameter of the chamber whereby a space 8 is provided between the outer periphery of the conveyor and the wall of the chamber.

The chamber is closed except for an inlet opening 9 in its side wall adjacent the base and an outlet opening 10 in its side wall adjacent the top.

A chute 16 having an inclined bottom 11 communicates with the inlet 9 and is adapted to direct into such inlet a mixture of seeds and dust, as indicated at 12, which is discharged into the chute from a pipe 13.

The pipe 13 is adapted to communicate with any suitable pre-mixing device 14, as indicated in dotted lines, for the seeds and dust. Such a pre-mixing device may be one such as described in applicant's prior Patent No. 2,207,924.

The inclined bottom 11 is preferably removably mounted on supports 15 so that it may be readily removed to permit easy access to the conveyor chamber, chute and premixing device, for cleaning purposes.

The outlet 10 discharges into a housing or chute 17 for subsequent handling. As shown in the drawing, a two-way bagging mechanism 19 of usual design may be associated with the chute 17, such mechanism constituting a filling means for the bag 18.

In operation, the pre-mixed seed and dust are fed into the inlet 9 by the chute 15, and the conveyor is driven to cause upward movement of the material thereon. Since the outer periphery of the conveyor is spaced from the walls of the chamber, a quantity of the material being conveyed continually slides off the edge of the conveyor blade. The escaping stream of material falls from one flight of the conveyor to the accumulation of material on the next, where a further commingling of seed and dust takes place and the escaping stream continues to the bottom of the chamber. This continual dropping of a portion of the seed and dust from one flight of the conveyor to the next constitutes a particularly effective commingling treatment while resulting in no injurious effect on the seed.

In the meantime, the conveyor discharges through the outlet 10 into the bagging mechanism a constant stream of thoroughly commingled seed and dust.

It will be observed that the arrangement described, in addition to providing an effective mixing treatment, constitutes an automatic bag filling device wherein the material being handled is in a substantially dust-tight enclosure at all times. It will, however, be understood that the chute 17 may lead directly to a storage bin or to another machine, such as an automatic weigher and sacker.

It will be apparent that various changes in mechanical details and arrangement of parts may be made in the structure described without departing from the spirit and scope of the invention as defined in the appended claim.

I claim:

A seed and dust mixing and handling device comprising a vertically disposed substantially cylindrical housing, said housing having a bottom inlet and a top outlet, means for feeding mixed seed and dust to said inlet, and a screw conveyor in said housing for moving said seed and dust and having a helical blade of uniform width throughout its length and extending from a point adjacent the inlet to a point adjacent the outlet, the periphery of said blade throughout its length being uniformly spaced from the wall of the housing to provide an annular space extending from the inlet to the outlet and of sufficient width to provide a continuous zone in which a portion of the seed and dust on the conveyor falls and while returning towards the bottom of the housing is successively mixed with the rising mixture.

HAROLD JESSE KEMP.

REFERENCES CITED

The following references are of record in the file of this patent:

UNITED STATES PATENTS

| Number | Name | Date |
| --- | --- | --- |
| 692,011 | Hansen | Jan. 28, 1902 |
| 1,498,379 | Jahn | June 17, 1924 |
| 1,558,580 | Bishop | Oct. 27, 1925 |
| 1,473,165 | Steigmeyer | Nov. 6, 1923 |
| 1,629,050 | Puls | May 17, 1927 |